(12) United States Patent
Dening et al.

(10) Patent No.: US 7,879,269 B1
(45) Date of Patent: Feb. 1, 2011

(54) FERRITE POWDER OPTIMIZED FOR FABRICATION OF FERRITE FEATURES AND RELATED METHODS

(75) Inventors: David C. Dening, Stokesdale, NC (US); John Bernard Ings, Rockaway, NJ (US); Peters Valdemars Erins, Sparta, NJ (US)

(73) Assignee: RF Micro Devices, Inc., Greensboro, NC (US)

( * ) Notice: Subject to any disclaimer, the term of this patent is extended or adjusted under 35 U.S.C. 154(b) by 663 days.

(21) Appl. No.: 11/854,760

(22) Filed: Sep. 13, 2007

Related U.S. Application Data

(60) Provisional application No. 60/825,522, filed on Sep. 13, 2006.

(51) Int. Cl.
*B29C 43/02* (2006.01)
*C01G 49/02* (2006.01)

(52) U.S. Cl. ............... 264/115; 264/122; 264/DIG. 58; 252/62.56

(58) Field of Classification Search ........................ None
See application file for complete search history.

(56) References Cited

U.S. PATENT DOCUMENTS

| | | | | |
|---|---|---|---|---|
| 4,588,617 A | * | 5/1986 | Oka | 427/443.1 |
| 4,749,434 A | * | 6/1988 | Harrison | 156/306.9 |
| 4,808,326 A | * | 2/1989 | Tanino et al. | 252/62.54 |
| 5,250,255 A | * | 10/1993 | Sagawa et al. | 419/39 |
| 5,300,171 A | | 4/1994 | Braun et al. | |
| 5,856,373 A | | 1/1999 | Kaisaki et al. | |
| 5,897,063 A | * | 4/1999 | Patzelt et al. | 241/24.1 |
| 2003/0044361 A1 | | 3/2003 | Chen | |
| 2006/0255192 A1 | * | 11/2006 | Tomikawa et al. | 241/24.1 |
| 2007/0102663 A1 | * | 5/2007 | Xiao et al. | 252/62.51 C |

FOREIGN PATENT DOCUMENTS

JP 5059159 A 3/1993

OTHER PUBLICATIONS

Moon, Kyoung Sik et al., "High Filler Loading Technique and its Effects on the Reliability of Epoxy molding Compound," Proceedings of the 2nd Electronics Packaging Technology Conference, 1998, pp. 318-324, IEEE.
"Epoxy Dispersion Formulations Cured with Dicyandiamide," 2001, Starting Formulation No. 9000, SC:2119-01, Resolution Performance Products.
Epoxies, Etc., Material Safety Data Sheet, pp. 1-7 (Jul. 27, 2006).

* cited by examiner

*Primary Examiner*—Mary Lynn F Theisen
(74) *Attorney, Agent, or Firm*—Winthrow & Terranova, P.L.L.C.

(57) ABSTRACT

The present invention pertains to a method for manufacturing a ferrite powder for use in making PCB ferrite features. The ferrite powder is easily applied and provides a high ferrite-packing factor. The ferrite powder is a mixture of varying sizes of ferrite particles, an epoxy powder, and curing agent powder.

16 Claims, 2 Drawing Sheets

FERRITE POWDER OPTIMIZED FOR FABRICATION OF FERRITE FEATURES AND RELATED METHODS

This application claims the benefit of U.S. provisional patent application Ser. No. 60/825,522, filed Sep. 13, 2006, the disclosure of which is incorporated herein by reference in its entirety.

CROSS-REFERENCE TO RELATED APPLICATIONS

This application is related to concurrently filed application Ser. No. 11/854,736 entitled FERRITE PASTE OPTIMIZED FOR MAKING PCB FERRITE FEATURES AND RELATED METHODS, the disclosure of which is hereby incorporated by reference in its entirety.

FIELD OF THE INVENTION

The present invention relates to ferrite material technology, and more particularly relates to manufacturing ferrite powder optimized for making ferrite structures, such as inductor bobbins, transformer cores, balun cores and the like, that exhibit higher frequency performance than sintered ferrite features.

BACKGROUND OF THE INVENTION

Radio Frequency (RF) communication devices require inductive elements in the form of inductor bobbins, transformer cores, balun cores, and the like, in their transmitter and receiver circuitry. As the operating frequencies of these RF communication devices increase, the operating frequencies of the inductive elements must increase accordingly.

Unfortunately, ferrite objects are normally manufactured by pressing spray dried, un-sintered ferrite powder into a mold using high hydrostatic pressures. Next, the object is removed from the mold and sintered in a furnace until the ferrite particles bind together via a partial melting at the points where they touch. Typically these ferrite objects exhibit a relatively high permeability that limits their applications to the lower operating frequencies. Lowering the permeability allows higher frequency operation.

Therefore there is a need for a ferrite object that allows higher frequency operation.

SUMMARY OF THE INVENTION

The present invention pertains to a method for manufacturing a ferrite powder for use in making ferrite objects that do not require a final sintering. The ferrite powder is easily applied and provides a high ferrite-packing factor. The ferrite powder is a mixture of various sizes of ferrite particles, an epoxy powder, and a curing agent.

The use of the ferrite particles of varying size allows the ferrite powder to provide the high ferrite-packing factor. A method for manufacturing these varying sized ferrite particles begins by providing various sized particles from a sintering process. Next, ferrite particles below a predetermined approximate size are selected as relatively coarse ferrite particles. Ferrite particles above the predetermined approximate size are ground to create finer ferrite particles. The relatively coarse ferrite particles and the relatively finer ferrite particles may be used to create the ferrite powder.

Next, the relatively coarse ferrite particles, relatively finer ferrite particles, epoxy powder and curing agent powder are mixed to form a ferrite powder. The ferrite powder is deposited into a mold to create a ferrite element. Subsequent processing may heat and cure the ferrite powder to solidify the ferrite element. The ferrite element may be removed from the mold and machined to provide a ferrite feature with a desirable shape and size.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a method for manufacturing ferrite powder. This ferrite powder may be used in the manufacture of printed circuit board (PCB) ferrite features to include embedded inductors and the like. These inductors can be made on a PCB by pressing the heavily loaded ferrite powder onto spiral or other inductive patterns disposed on the PCB. Optionally, the inductors may be imbedded within the board during the process of laminating layers of the PCB.

The ferrite powder should have a high concentration of ferrite material and be relatively easy to apply. The present invention provides a method for making a ferrite powder that is easily applied while providing a high ferrite-packing factor. The ferrite powder is a mixture of varying sizes of ferrite particles, an epoxy powder, and a curing agent powder. The use of the varying sized ferrite particles allows the ferrite powder to provide the high ferrite-packing factor. The varying sized ferrite particles are mixed with an epoxy powder and curing agent powder to form a ferrite powder. During subsequent processing, the ferrite powder is cured, removed from a mold and machined to provide a solid ferrite feature in a desirable shape and size.

Figure 1:
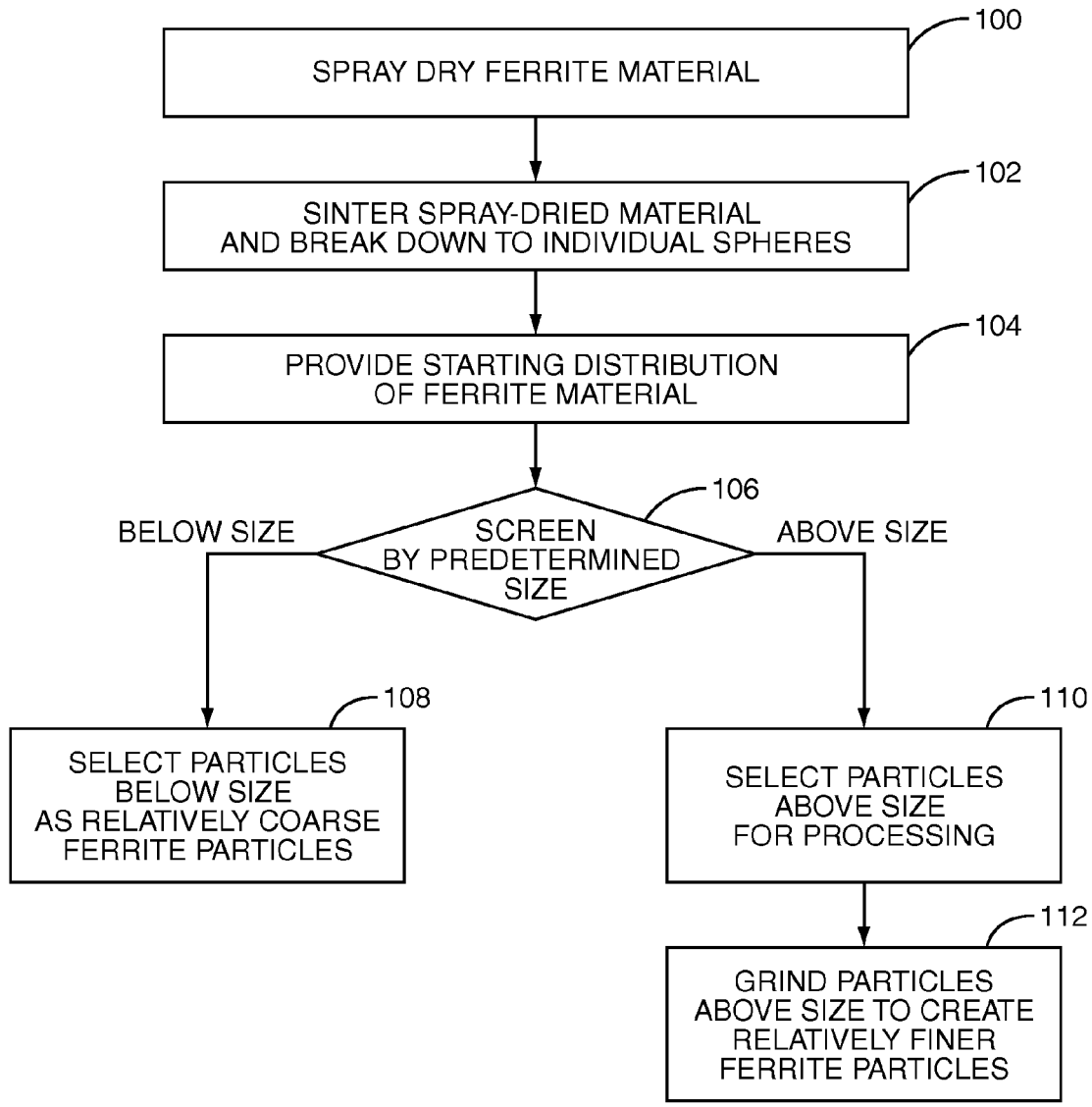
FIG. 1 is a flow diagram detailing the distribution process of the ferrite particles according to one embodiment of the present invention.

In one embodiment, the varying sizes of ferrite particles may be created according to the process flow of FIG. 1. Further details on the process for making the ferrite powder follow. Initially, a slurry of ferrite material is processed through a spray drying operation (step 100). Next, the spray-dried ferrite material undergoes a sintering process and is broken down into individual relatively spherical particles (step 102). These relatively spherical particles are then provided as a starting distribution of relatively spherical ferrite particles for the following steps (step 104).

Next, the spherical ferrite particles are screened by a predetermined approximate size, which may be approximately 190 μm (step 106). This process will separate the ferrite particles above this predetermined approximate size from the relatively coarse ferrite particles that are below this predetermined approximate size. This screening process may be employed using a 120-mesh sieve, filter, or the like to sift the ferrite particles below the predetermined approximate size through, while confining the ferrite particles above the predetermined approximate size to the surface of the screening mechanism. The resulting distribution of ferrite particles may now be selected as either those below the predetermined size (step 108) or those above the predetermined size (step 110). In an exemplary embodiment, the particle size for those ferrite particles below the predetermined approximate size may be approximately 10 μm-190 μm in size.

The ferrite particles that are above the predetermined approximate size may further undergo a grinding process in order to create relatively finer ferrite particles (step 112). These relatively finer ferrite particles may be approximately 1 μm in size and are substantially smaller and finer in shape than those relatively coarse ferrite particles that were below the predetermined approximate size. A majority of the relatively finer ferrite particles are an order of magnitude or less smaller than a majority of the relatively coarse particles. These relatively finer ferrite particles will fill in the gaps between the relatively coarse ferrite particles when mixed together, increasing the density and the magnetic performance of the ferrite powder to be created. The distribution of ferrite particles may be further processed as discussed below to create a ferrite powder.

Figure 2:
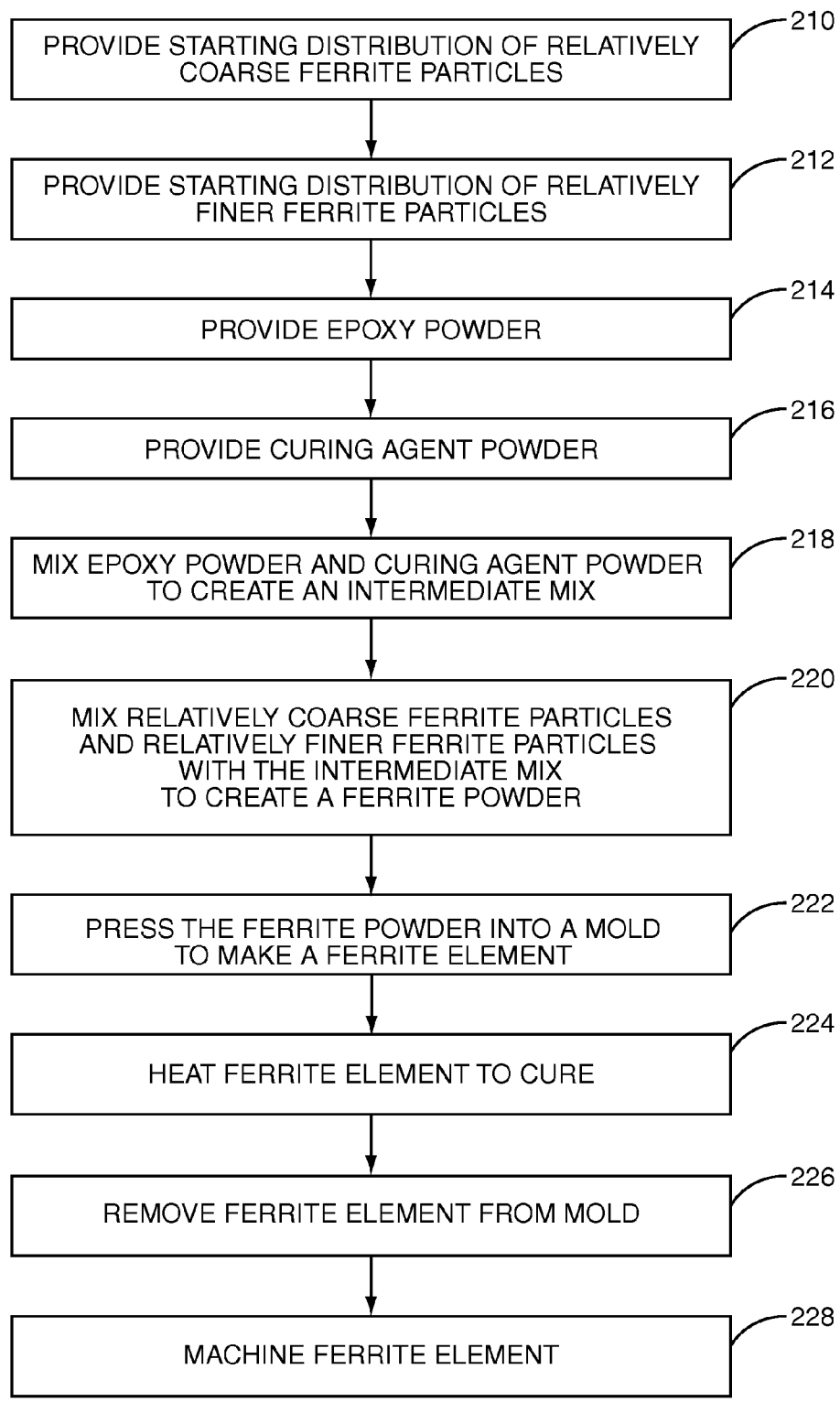
FIG. 2 illustrates the corresponding steps associated with the manufacturing process of a ferrite powder according to one embodiment of the present invention.

FIG. 2 illustrates the corresponding steps associated with the manufacturing process of the ferrite powder according to one embodiment of the present invention. Initially, a starting distribution of relatively coarse ferrite particles is provided (step 210). Next, a starting distribution of relatively finer ferrite particles is provided (step 212).

An epoxy powder, which may be EPON Resin 2004, Huntsman Araldite GT 6071, or the like, is provided (step 214). In some cases, the epoxy powder may comprise epoxy particles, which are approximately 1 micron to 5 microns in size to match the relatively finer ferrite particles. In one embodiment, the epoxy powder and curing agent powder fully cure in approximately 1.5 to 2 minutes at approximately 232 Celsius. The epoxy powder, when cured, should exhibit good electrical and mechanical properties, such as high glass transition temperature and low electrical loss.

Next, a curing agent powder, which may be EPI-CURE Curing Agent P-104, dicyandiamide, or the like, is provided (step 216). The curing agent powder is a chemically active compound that will provide the means to alter the physical property of the epoxy powder from a thermoplastic state to a thermoset state during the curing process. The curing agent powder is approximately 0.5% to 10% of the epoxy powder and curing agent powder combined. The curing agent powder may offer a B-stage cure for the epoxy and may provide a high glass transition temperature when cured at elevated temperatures. Other curing agent powders known to those skilled in the art may be used.

Next, the epoxy powder and the curing agent powder are mixed to create an intermediate mix (step 218). In a preferred embodiment, the intermediate mix may be approximately 2%-10% curing agent powder, with the remaining intermediate mix being approximately 90%-98% epoxy powder. Next, the relatively coarse ferrite particles and the relatively finer ferrite particles are combined with the intermediate mix to create a ferrite powder (step 220). The ferrite powder may consist of approximately 5%-12% of the intermediate mix, with the remaining ferrite powder being approximately 88%-95% ferrite particles. The ferrite powder may include up to approximately 40% of the relatively finer ferrite particles by weight.

Alternatively, the epoxy powder, or the epoxy powder and the curing agent, may be mixed with the finer ferrite particles during the process of grinding the ferrite particles above the predetermined approximate size. The finer ferrite particles and the coarse ferrite particles, mixed together, increase the packing density, and thus increase the magnetic performance of the ferrite feature that is made from the ferrite powder.

Next, the ferrite powder is pressed into a mold to make a ferrite element (step 222). The ferrite powder is then heated at approximately 230 Celsius in order to cure the epoxy powder within the ferrite element (step 224).

The resulting ferrite element may be made up of approximately 93% ferrite particles by weight and approximately 7% intermediate mixture. The ferrite element may then be removed from the mold (step 226). In an alternative embodiment, the ferrite element may be heated at approximately 230 Celsius to cure, after the ferrite element has been removed from the mold. Subsequent processing may machine the ferrite element to provide a ferrite feature with a desirable shape and size (step 228).

The method and materials used in this process of manufacturing the ferrite powder can improve magnetic performance, provide higher production yields, and enable a more effective application of the ferrite powder. The ferrite powder is a mixture of varying sizes of ferrite particles, an epoxy powder, and a curing agent powder. The use of ferrite particles of varying size allows the ferrite powder to provide the high ferrite-packing factor. A higher production yield can be achieved by facilitating a more efficient process through easy ferrite powder application. During subsequent processing, the ferrite powder is cured, removed from the mold, and machined to provide a solid ferrite feature in a desirable shape and size.

Those skilled in the art will recognize improvements and modifications to the preferred embodiments of the present invention. All such improvements and modifications are considered within the scope of the concepts disclosed herein and the claims that follow.

What is claimed is:

1. A method for manufacturing coarse ferrite particles and finer ferrite particles to be used in making a ferrite powder, comprising:

providing various sized ferrite particles;

selecting ones of the various sized ferrite particles below a predetermined approximate size as relatively coarse ferrite particles;

grinding ones of the various sized ferrite particles above the predetermined approximate size to create relatively finer ferrite particles; and mixing the relatively course ferrite particles, the relatively finer ferrite particles, an epoxy powder, and a curing agent powder to create a ferrite powder.

2. The method of claim 1 wherein one of the group consisting of the epoxy powder and a mixture of the epoxy powder and the curing agent powder is mixed with the ferrite particles during the grinding of the ferrite particles above the predetermined size.

3. The method of claim 1 wherein the ferrite powder comprises up to approximately 40% of the relatively finer ferrite particles by weight.

4. The method of claim 1 wherein the relatively finer ferrite particles are around about 1 μm in size.

5. The method of claim 1 wherein the relatively coarse ferrite particles are approximately 10 μm-190 μm in size.

6. The method of claim 1 wherein a majority of the relatively finer ferrite particles are an order of magnitude or less smaller than a majority of the relatively coarse ferrite particles.

7. A method comprising:
creating a ferrite powder mixture of relatively course ferrite particles, relatively finer ferrite particles, an epoxy powder, and a curing agent powder by:
providing sintered ferrite particles;
selecting ones of the sintered ferrite particles below a predetermined approximate size as the relatively coarse ferrite particles;
grinding ones of the sintered ferrite particles above the predetermined approximate size to create the relatively finer ferrite particles; and
mixing one of the group consisting of the epoxy powder and a mixture of the epoxy powder and the curing agent powder with the relatively finer ferrite particles during the grinding of the sintered ferrite particles above a predetermined size;
pressing the ferrite powder mixture into a mold; and
heating the powder mixture to cure to create a ferrite element.

8. The method of claim 7 wherein the relatively finer ferrite particles comprise ferrite particles substantially below the size of the relatively coarse ferrite particles.

9. The method of claim 7 wherein the curing agent powder is approximately 2%-5% of the epoxy powder and the curing agent powder combined.

10. The method of claim 7 wherein the curing agent powder is approximately 0.5% to 10% of the epoxy powder and curing agent powder combined.

11. The method of claim 7 wherein the curing agent powder and the epoxy powder are approximately 5%-12% of the ferrite powder.

12. The method of claim 7 wherein the curing agent powder and epoxy powder are approximately 7% of the ferrite powder.

13. The method of claim 7 further comprising removing the ferrite element from the mold.

14. The method of claim 7 further comprising machining the ferrite element to a particular shape or size.

15. The method of claim 7 wherein the ferrite element is heated to cure prior to removing the ferrite element from the mold.

16. The method of claim 7 wherein the ferrite element is heated to cure after removing the ferrite element from the mold.

* * * * *

UNITED STATES PATENT AND TRADEMARK OFFICE
CERTIFICATE OF CORRECTION

PATENT NO. : 7,879,269 B1  
APPLICATION NO. : 11/854760  
DATED : February 1, 2011  
INVENTOR(S) : David C. Dening et al.

Page 1 of 1

It is certified that error appears in the above-identified patent and that said Letters Patent is hereby corrected as shown below:

In column 4, at line 57 in claim 1, replace "course" with --coarse--.

In column 5, at line 10 in claim 7, replace "course" with --coarse--.

Signed and Sealed this
Fifth Day of April, 2011

David J. Kappos
*Director of the United States Patent and Trademark Office*